March 7, 1967 J. L. SCHWARTZ 3,307,729
CONTAINER HAVING GEAR-LIKE CORNERS
Filed Jan. 15, 1964 3 Sheets-Sheet 1
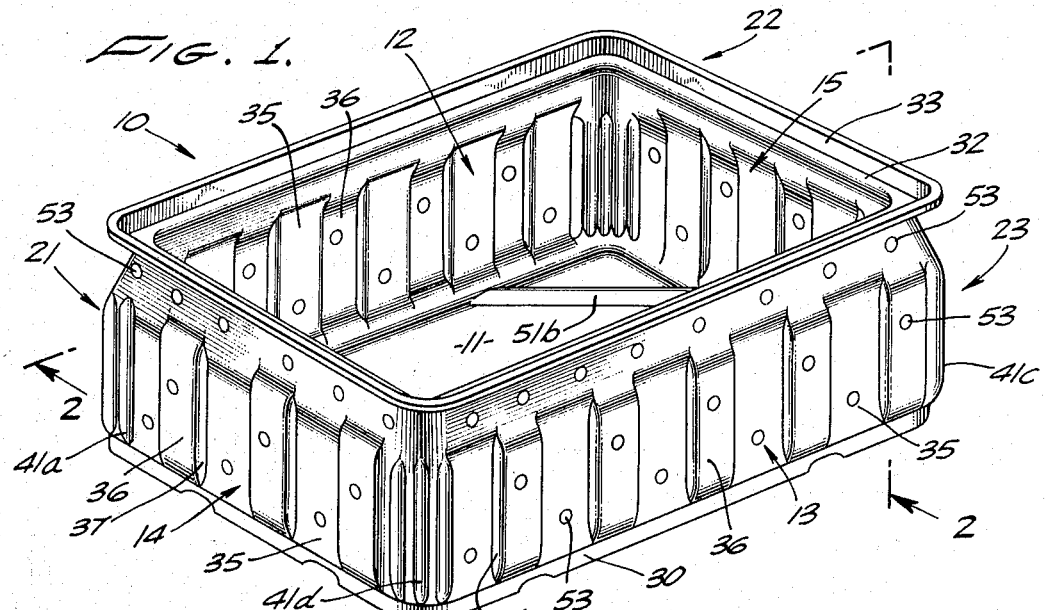
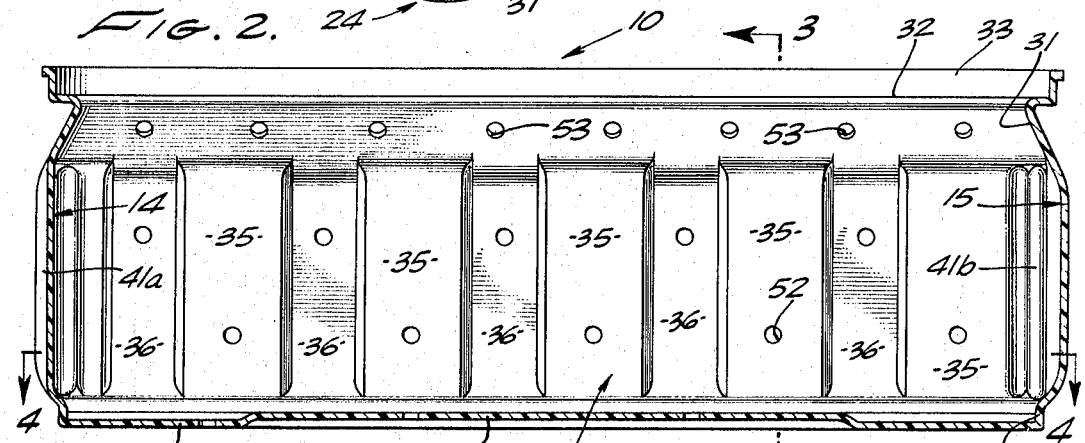
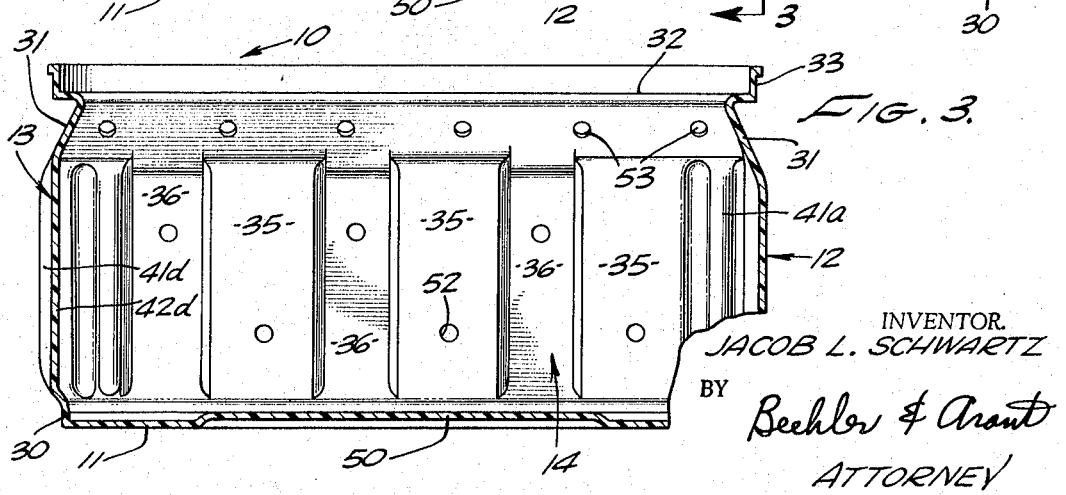
INVENTOR.
JACOB L. SCHWARTZ
BY
Beehler & Arant
ATTORNEY March 7, 1967  J. L. SCHWARTZ  3,307,729
CONTAINER HAVING GEAR-LIKE CORNERS
Filed Jan. 15, 1964  3 Sheets-Sheet 2

INVENTOR.
JACOB L. SCHWARTZ
BY Beehler & Arant
ATTORNEY

March 7, 1967  J. L. SCHWARTZ  3,307,729
CONTAINER HAVING GEAR-LIKE CORNERS
Filed Jan. 15, 1964  3 Sheets-Sheet 3

INVENTOR.
JACOB L. SCHWARTZ
BY Beehler & Arant
ATTORNEY

United States Patent Office 3,307,729
Patented Mar. 7, 1967

3,307,729
CONTAINER HAVING GEAR-LIKE CORNERS
Jacob L. Schwartz, Covina, Calif., assignor, by mesne assignments, to Shell Oil Company, New York, N.Y., a corporation of Delaware
Filed Jan. 15, 1964, Ser. No. 337,954
4 Claims. (Cl. 220—1)

The present invention relates to a container having gear-like corner portions adapted to be drivingly engaged for rotatably moving the container in a direction parallel to the plane of its bottom wall.

In the automatic handling of containers used in industry and agriculture it is well known to transport the containers on automatic conveyors, to fill them or empty them by automatic means, and to close their tops by automatic machinery. The present invention is based upon a recognition that there are certain situations, however, in which it is also desirable to be able to rotatably move a container parallel to the plane of tis bottom wall, while at the same time precisely controlling the amount of rotatable or pivotal motion which is imparted to it.

The primary object of the invention, therefore, is to provide an improved container which is specifically adapted to be rotatably moved in a direction parallel to the plane of its bottom wall, by a precisely controlled amount.

The present application discloses in detail an integrally formed plastic container which has been specifically designed for use in agriculture, in the harvesting and processing of tomatoes by automatic means.

In order to provide the basis for a full understanding of the present invention it will be advisable to first describe the manner of its use in the harvesting and processing of tomatoes. The containers are placed on a pallet which is loaded on a flatbed truck. The width of the pallet is sufficient to accommodate the length of two containers, and the length of the pallet is sufficient to accommodate the width of three containers. Therefore, six containers are stacked on the pallet. The containers are stacked nine high, so each pallet carries a total of 54 containers. In the tomato field the truck carrying empty containers is driven along beside the automatic harvesting machine. The containers picked up by hand from the truck are placed on a conveyor which transports them downward to the harvester, where they are loaded with tomatoes. Each container when loaded is put on a return conveyor to the truck, where it is again placed on a pallet. When the truck returns to the processing plant it carries a number of pallets, on each of which there are 54 loaded boxes of tomatoes. Each pallet is then picked up from the truck by a forklift, and placed on an automatic dumping machine. The dumping machine dumps a pair of containers that are engaged end-to-end, upon a pair of conveyors. The containers are dropped on the conveyors on their sides, and just before their release by the dumper are pivoted somewhat at their inner and upper corners, so as to insure that each container dumps its load on a separate one of the two conveyors. From these conveyors the tomatoes eventually drop underneath, to go through various washing and other processes, while the containers are carried by the conveyors onward to an automatic washing station. After washing the then empty containers are ready to be loaded on a pallet and carried to the field to pick up another load of tomatoes.

From the foregoing description of the use of the containers of the present invention in the harvesting and processing of tomatoes, it will be seen that nestability of the containers is not required; vertical stacking of loaded containers to a fairly high elevation is necessary; side-by-side and end-to-end alignment of the containers in non-sliding engagement on the pallet is required; and during the dumping process it is necessary that a pair of the containers undergo a certain pivotal movement relative to each other, but without slipping apart. From the following description it will be seen that the present invention fully satisfies all of these requirements.

The objects and advantages of the invention will be more fully apparent from the following description considered in conjunction with the accompanying drawings, wherein:

FIGURE 1 is a perspective view of the invention;

FIGURE 2 is a longitudinal cross-sectional view taken on the line 2—2 of FIGURE 1;

FIGURE 3 is a transverse cross-sectional view taken on the line 3—3 of FIGURE 2;

Figure 4:
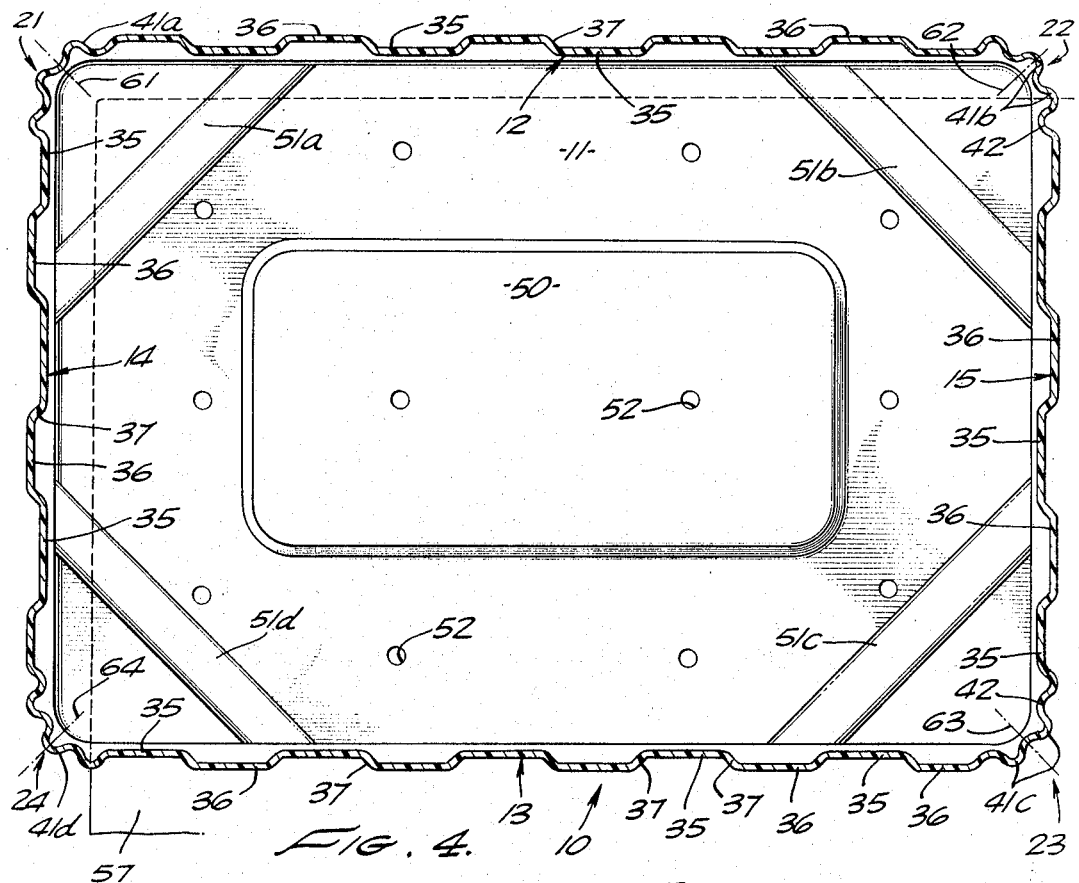
FIGURE 4 is a cross-sectional plan view taken on the line 4—4 of FIGURE 2.

Reference is now made to FIGURES 1 to 4 which illustrate the container of the present invention.

A container 10 is seen to include a substantially flat bottom wall 11, parallel side walls 12 and 13, and parallel end walls 14 and 15. The container 10 is integrally formed of plastic material having a substantially uniform wall thickness throughout. The juncture of side wall 12 and end wall 14 form a corner which is generally identified as 21; the juncture of side wall 12 and end wall 15 form a corner which is generally identified as 22; the juncture of side wall 13 and end wall 15 form a corner which is generally identified as 23; and the juncture of side wall 13 and end wall 14 form a corner which is generally identified as 24. It will be seen that the corners 21, 22, 23, and 24 form a clockwise series, as viewed from the top of the container.

Figure 5:
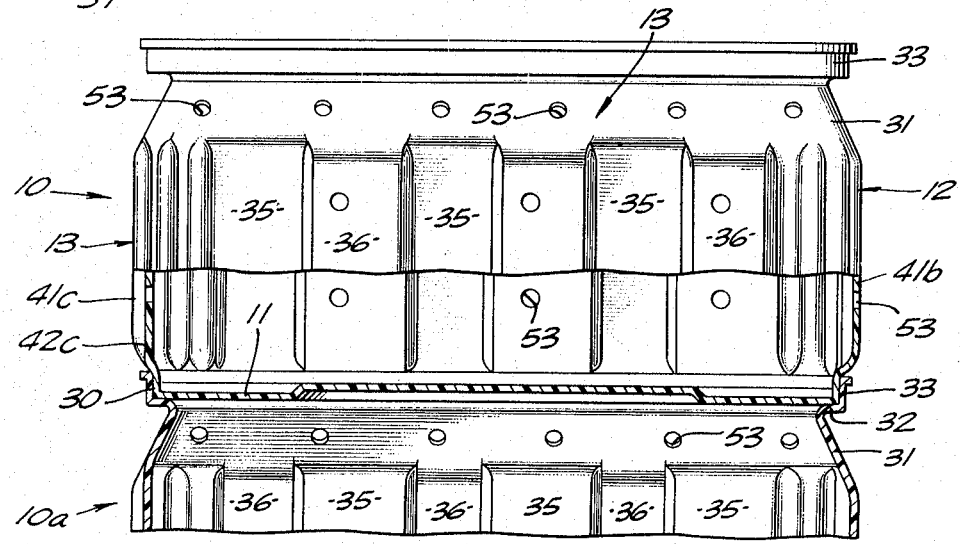
FIGURE 5 is an end view, partially in cross-section, showing two of the containers stacked together.

The lowermost portion of each side and end wall is a relatively short vertical wall section 30. Above the section 30 the main portion of the height of each side and end wall is devoted to a horizontal series of depressions, valleys, and ridges, as will be explained. Above the depression, valley and ridge formations each side and end wall slopes inwardly at 31, the wall sections 31 being inclined inwardly from the vertical by approximately 30°. At the upper end of the wall sections 31 each side and end wall is reversely bent, by approximately 120°, to form a horizontal stacking shelf 32 which extends outwardly from the upper end of the wall sections 31. At the outer edge of stacking shelf 32 the side and end walls are bent upward, at an angle of 90°, to provide a vertical flange 33. The flange 33 is vertically aligned with the lowermost wall sections 30, but is displaced outwardly therefrom by the amount of the wall thickness, so that as best seen in FIGURE 5 when an upper container 10 is stacked upon an identical lower container 10a the vertical wall 30 of the upper container engages the inner wall surface of the flange 33 of the lower container, while the periphery of the bottom wall 11 of the upper container rests upon the stacking shelf 32 of the lower container.

As best seen in FIGURE 4, each side and end wall has inward depressions 35 and outward depressions 36 formed alternately therein. Each of the depressions consists of an essentially flat rectangular wall section, the depth of each depression being somewhat greater than the wall thickness but a great deal less than the width of the depression. Adjacent ones of the inward depressions 35 and outward depressions 36 are joined together at their adjacent edges by a sloping wall section 37, these wall sections 37 being vertical but sloping in the horizontal plane, as seen in FIGURE 4, by an angle of approximately 45° relative to the side and end walls of the container. It will be seen that the wall sections 37 at opposite ends of one of the depressions 35 or 36, each being disposed at an angle of approximately 45° relative to the depression are also approximately perpendicular to each other.

Each of the corners 21, 22, 23, and 24 includes a plurality of alternately formed ridges 41 and valleys 42 which extend vertically, and hence perpendicular to the plane of the bottom wall 11. Each of the corner portions 21, 22, 23, and 24 has, in general, a curved configuration parallel to the plane of the bottom wall 11, which corresponds approximately to 90° of the arc of a circle. The ridges 41 are uniformly spaced, and each corner portion therefore has an outer surface which conforms essentially to one-quarter of the circumference of a gear wheel. For ease in differentiating them the ridges associated with the corner 21 are identified as 41a; those on the corner 22 as 41b; those on the corner 23 as 41c; and those on the corner 24 as 41d.

Figure 6:
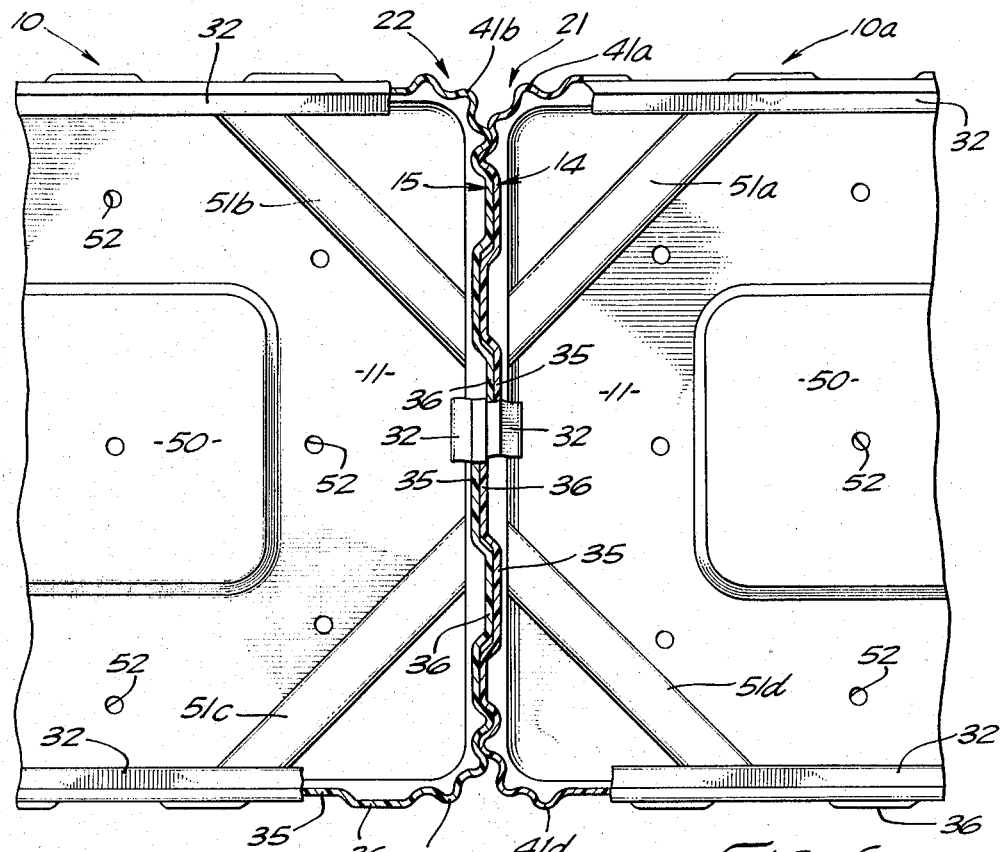
FIGURE 6 is a plan view, partially in cross-section, showing the ends of two of the containers inter-engaged in nonslidable relationship.

The wall depressions 35 and 36 are formed in such a way that each inward depression 35 in one of the side or end walls is directly opposite an outward depression 36 in the other side or end wall. This configuration permits two of the containers when placed in the same plane to have their end walls or their side walls interengaged in nonslidable and coextensive relationship, as is best seen in FIGURE 6.

The configuration of the gear-like corners also involves a phase, or positional, difference. This arrangement is best seen in FIGURE 4. Let it be assumed that the common plane (the average position) of the inward depressions 35 and outward depressions 36 of each side wall and each end wall were plotted and were extended, so that intersections of these common planes were formed at the four corners of the container. Let it further be assumed that a line were drawn inward of the container bisecting each of these four corners. Such bisecting line is shown as a short dotted line 61 in the corner 21; 62 in the corner 22; 63 in the corner 23; and 64 in the corner 24. It will readily be seen that the bisecting lines 61 and 63 associated with the corners 21 and 23 fall in the center of one of the valleys 42 of the wall formation; whereas the bisecting lines 62 and 64 of the corners 22 and 24 fall in the centers of ridges 41 of the outer wall formation. It may therefore be stated that the ridges 41a and 41c forming the gear teeth on the diagonally opposite corners 21 and 23 have each the same position relative to their associated side and end walls, whereas the ridges 41b and 41d forming the gear teeth on the corners 22 and 24 have each the same position relative to their associated side and end walls, but are displaced half a tooth space relative to ridges 41a and 41c.

While it is true that the inward and outward wall depressions 35 and 36 permit two identical containers to be disposed in end-to-end or side-by-side relationship in coextensive alignment and interlocking engagement, it is also true that this relationship may be established by the corners alone, without the use of the side wall and end wall formations. Thus as seen in FIGURE 6 where the end wall 15 of container 10 inter-engages the end wall 14 of a like container 10a, the ridges 41a of container 10a interlock with the ridges 41b of container 10, and ridges 41d of container 10a interlock with the ridges 41c of container 10, so as to provide a non-slidable inter-engagement of the two end walls, while the containers are at the same time coextensively aligned. This same relationship would exist if the containers were engaged side-by-side. Thus, if the side wall 13 of container 10 engaged the side wall 12 of container 10a, the inter-engagement of ridges 41c on container 10 with ridges 41b on container 10a, and of ridges 41d on container 10 with ridges 41a on container 10a, would again insure that the two containers were coextensively aligned and in non-sliding engagement.

In order to permit the ridge and depression formations of the side and end walls to operate in their intended manner, it is necessary that the ridges 41 and the outward depressions 36 project somewhat outwardly beyond the flange 33 of the stacking shelf 32. This relationship is best shown in FIGURE 6.

Figure 7:
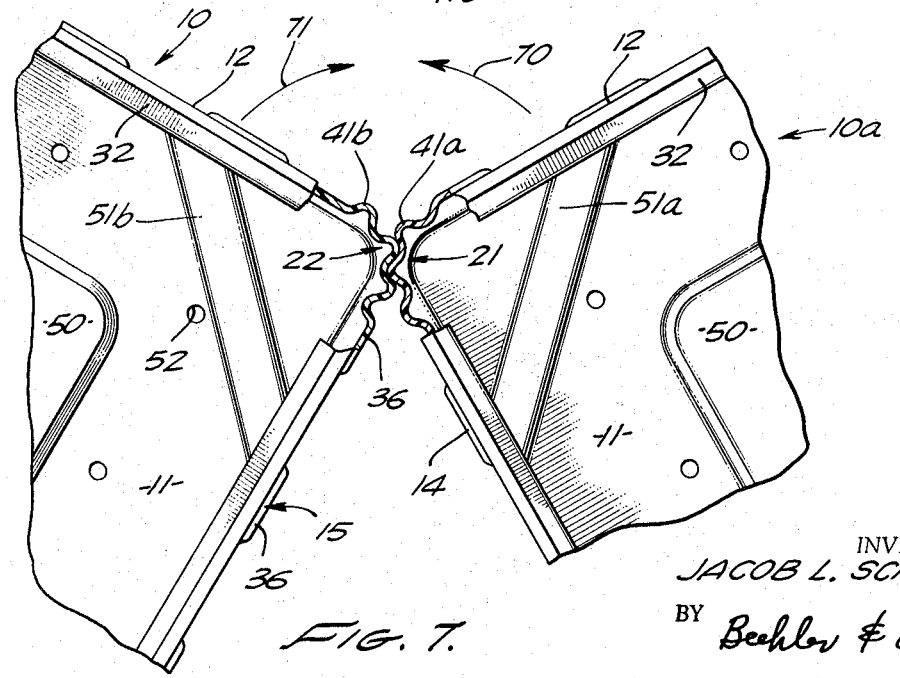
FIGURE 7 shows the containers of FIGURE 6 being rotated relative to each other.

The configuration of the gear-like corners also permits two inter-engaged containers to be rotated relative to each other, from a position in which their end walls are in coextensive engagement, to a position in which their side walls are in coextensive engagement. This relationship is illustrated in FIGURE 7 of the drawings. In FIGURE 7 it will be noted that the relative rotation of the two containers in a direction shown by arrows 70 and 71 will result in the inter-engagement of the walls 12 of the two containers with each other. When that relationship is achieved the containers are coextensively aligned, just as they would be if the side wall 12 of one container were engaging the side wall 13 of the other container.

In the harvesting and processing of tomatoes the automatic dumper tilts a pair of the containers over the pair of conveyors until the containers have their bottom walls 11 in a vertical plane and their adjacent ends inter-engaged, as shown in FIGURE 6. Then the gripping arms of the dumper commence to release the outer ends of the containers, just above the conveyors. The inner ends of the containers then rotate relative to each other, as shown in FIGURE 7, prior to dropping onto the respective conveyors. For the purposes of this paragraph FIGURES 6 and 7 are considered as vertical elevational views rather than as horizontal plan views.

The container 10 also has a raised central section 50 in the center of its bottom wall 11. Holes 52 are formed at various locations in the bottom wall 11, and holes 53 are formed at various locations in the side and end walls. The upper rows of holes on the side and end walls are used for injecting preservative spray powders into the containers, and onto the tomatoes, whenever loaded containers of tomatoes are going to be setting for an appreciable period of time at the processing plant. The purpose of the holes in the bottom wall is for moisture evaporation, or for drainage of moisture, and also to relieve water pressure during the automatic washing of the containers.

When a group of six of the containers are loaded onto a pallet, providing two rows of three containers each, the length and width of the pallet may be less than the total length and width of the group of containers. This relationship is illustrated in FIGURE 4 wherein the pallet is designated 57. Assuming that the outer side and end walls of the containers extend over the outer edges of the pallet, as indicated in FIGURE 4, a serious problem of mechanical support of the loaded containers is presented. For this reason a plurality of raised rib structures 51 are formed in the bottom wall 11. Each rib extends between an associated side and end wall at an angle of approximately 45° relative thereto. Each ridge is characterized throughout its length by a raised portion of the upper surface of the bottom wall, and a grooved portion of the under surface of the bottom wall. As shown in FIGURE 4 the rib associated with corner 21 is designated 51a, that associated with corner 22 as 51b, that associated with corner 23 as 51c, and that associated with corner 24 as 51d. While not specifically shown in the present drawings the cross-sectional configuration of the rib structure conforms, very approximately, to one-third the arc of a circle. Not only is the rib structure of the bottom wall useful in the event that the pallet is to small for the containers, but its equally useful in the event that the container is inadvertently misplaced on the pallet, so as to overhang one or more edges thereof.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

1. A container having a bottom wall, side walls, and end walls, each juncture of one of said side walls with one of said end walls forming a projecting portion which has a curved configuration in a plane parallel to the plane of said bottom wall corresponding approximately to 90° of the arc of a circle, and which has alternately formed ridges and valleys in the outward surface thereof which extend perpendicular to the plane of said bottom wall, said ridges being uniformly spaced; each said projecting corner portion thus providing substantially one-quarter of the circumference of a gear wheel, and being adapted to be drivingly engaged by a rotating gear wheel, or the like, for rotatably moving said container in the plane of said bottom wall; the ridges forming the gear teeth on one pair of diagonally opposite corners being displaced half a tooth's space relative to the associated side and end walls from the position of the ridges forming gear teeth on the other pair of diagonally opposite corners.

2. A container as defined in claim 1 which is integrally formed of plastic material having a substantially uniform wall thickness throughout.

3. A container as claimed in claim 1 in which the width of said valleys is substantially equal to the width of said ridges, whereby each said projecting corner portion is adapted to be rotatably driven by a projecting corner portion of an identical container.

4. A container as claimed in claim 1 which has a circumferentially extending lip formed on the upper extremity of its side and end walls, said ridges extending horizontally outward beyond the associated portion of said lip.

References Cited by the Examiner

UNITED STATES PATENTS

| | | | |
|---|---|---|---|
| 1,420,992 | 6/1922 | Erickson | 220—97 |
| 1,915,369 | 6/1933 | Lane | 220—97 |
| 1,920,515 | 8/1933 | Marsden | 220—97 X |
| 2,447,022 | 8/1948 | McCarl | 220—97 |
| 2,718,326 | 9/1955 | LeBlanc | 220—97 X |

FOREIGN PATENTS

| | | |
|---|---|---|
| 1,306,810 | 9/1962 | France. |
| 1,339,900 | 9/1963 | France. |
| 613,736 | 12/1948 | Great Britain. |
| 26,349 | 10/1915 | Norway. |
| 102,646 | 8/1963 | Norway. |

THERON E. CONDON, *Primary Examiner.*

GEORGE E. LOWRANCE, LOUIS G. MANCENE,
*Examiners.*